US008149996B2

(12) United States Patent
Nelson et al.

(10) Patent No.: US 8,149,996 B2
(45) Date of Patent: Apr. 3, 2012

(54) PROVIDING ROUTING INFORMATION TO AN ANSWERING POINT OF AN EMERGENCY SERVICES NETWORK

(75) Inventors: Michael Jay Nelson, Louisville, CO (US); Thomas LaClair, Longmont, CO (US); David Daniel Wolfe, Lafayette, CO (US)

(73) Assignee: West Corporation, Omaha, NE (US)

( * ) Notice: Subject to any disclaimer, the term of this patent is extended or adjusted under 35 U.S.C. 154(b) by 1306 days.

(21) Appl. No.: 11/773,519

(22) Filed: Jul. 5, 2007

(65) Prior Publication Data

US 2009/0010398 A1    Jan. 8, 2009

(51) Int. Cl.
 *H04M 11/04* (2006.01)
(52) U.S. Cl. ................... 379/45; 379/221.03
(58) Field of Classification Search ............ 379/45, 379/221.03
 See application file for complete search history.

(56) References Cited

U.S. PATENT DOCUMENTS

| | | | | |
|---|---|---|---|---|
| 5,249,223 A * | 9/1993 | Vanacore | ............... | 379/266.06 |
| 6,028,915 A | 2/2000 | McNevin | | |
| 6,067,356 A | 5/2000 | Lautenschlager et al. | | |
| 6,075,853 A * | 6/2000 | Boeckman et al. | ...... | 379/221.09 |
| 6,104,784 A * | 8/2000 | Robbins | ............... | 379/45 |
| 6,128,481 A * | 10/2000 | Houde et al. | ............... | 455/404.2 |
| 6,665,611 B1 | 12/2003 | Oran et al. | | |
| 6,744,858 B1 | 6/2004 | Ryan et al. | | |
| 6,771,742 B2 | 8/2004 | Mathis et al. | | |
| 6,914,896 B1 | 7/2005 | Tomalewicz | | |
| 6,940,950 B2 | 9/2005 | Dickinson et al. | | |
| 7,123,693 B2 | 10/2006 | Nelson et al. | | |
| 7,127,230 B2 | 10/2006 | Aaron | | |
| 2003/0086539 A1 | 5/2003 | McCalmont et al. | | |
| 2004/0184584 A1 | 9/2004 | McCalmont et al. | | |
| 2005/0190892 A1 | 9/2005 | Dawson et al. | | |
| 2006/0068753 A1 | 3/2006 | Karpen et al. | | |
| 2006/0078094 A1 | 4/2006 | Breen et al. | | |
| 2006/0233317 A1 | 10/2006 | Coster et al. | | |
| 2007/0003024 A1 | 1/2007 | Olivier et al. | | |
| 2007/0206507 A1 * | 9/2007 | Reichman et al. | ............ | 370/252 |
| 2008/0253535 A1 * | 10/2008 | Sherry et al. | ............... | 379/45 |
| 2011/0165894 A1 * | 7/2011 | Willey | ............... | 455/458 |

* cited by examiner

*Primary Examiner* — Creighton Smith (57) ABSTRACT

Networks, systems, and methods are disclosed for handling alternate routing scenarios for emergency calls or other special number calls, such as a 9-1-1 call. In routing an emergency call, an emergency services network identifies a primary answering point (e.g., a PSAP) to handle the emergency call. If the primary answering point is not available, then the emergency services network identifies an alternate answering point to handle the emergency call, and routes the emergency call to the alternate answering point (if available). The emergency services network also identifies alternate routing information indicating a reason for routing the emergency call to the alternate answering point instead of the primary answering point, and transmits the alternate routing information to the alternate answering point for processing.

27 Claims, 5 Drawing Sheets

PROVIDING ROUTING INFORMATION TO AN ANSWERING POINT OF AN EMERGENCY SERVICES NETWORK

BACKGROUND OF THE INVENTION

The invention relates to emergency services and, in particular, to providing alternate routing information to an answering point of an emergency services network. More particularly, this invention provides nominal emergency services call processing cases with information to allow a call taker to understand the call processing logic used for a specific call. Also, in an alternate routing scenario where a primary answering point is not available to handle an emergency call, the emergency services network routes the emergency call to an alternate answering point and also provides alternate routing information to the alternate answering point indicating a reason for routing the emergency call to the alternate answering point instead of the primary answering point.

In the United States, basic 9-1-1 service and Enhanced 9-1-1 service (E9-1-1) were developed for landline-based telephony as emergency reporting services where a calling party can dial 9-1-1 in emergency situations. When an emergency call, such as a 9-1-1 call, is placed at a telephone network, the telephone network identifies that the call is an emergency call and routes the call to a selective router, which is a dedicated 9-1-1 switch in an emergency services network. The selective router processes trunk that the call arrived on or the directory number of the calling party who placed the emergency call to select a Public Safety Answering Point (PSAP, also known as a "Public Safety Access Point") to handle the call. The selective router then routes the emergency call to the selected PSAP.

The call is answered at the PSAP by a call taker. The call taker converses with the calling party to determine information on the emergency situation. For instance, the call taker may ask the calling party for his/her name, the nature of the emergency, the location of the emergency, etc. The call taker then contacts emergency personnel to respond to the emergency based on the gathered information. E9-1-1 has the additional features of automatically providing the call taker with some information on the calling party. For instance, E9-1-1 service includes the features of Automatic Number Identification (ANI) and Automatic Location Identification (ALI). With ANI, the call taker at the PSAP is automatically provided with the telephone number of the phone placing the emergency call to allow for call back. The PSAP also uses the ANI to query the ALI database for information on the physical location of the calling party's phone. The ALI database stores records mapping telephone numbers to information on a physical location (such as a street address). Responsive to the query from the PSAP, the ALI database returns the location information for the calling party. With the telephone number and the location information, the call taker can more effectively handle the emergency call.

The logic in a typical selective router is as follows. Responsive to receiving an emergency call, the selective router determines whether trunk-only routing is enabled. If trunk-only routing is enabled, then the selective router routes the emergency call to a PSAP identified by a relationship with the trunk over which the selective router received the emergency call. If trunk-only routing is not enabled, then the selective router performs selective routing based on the calling party number. In the selective routing process, the selective router may query a selective routing database based on the calling party number to acquire an Emergency Service Number (ESN). Based on the ESN, the selective router builds a list of PSAP's (or other destinations) to handle the emergency call. The selective router identifies one of the PSAP's as the primary PSAP, and the other PSAP's as alternate PSAP's.

The selective router then attempts to route the emergency call to the primary PSAP. Before routing the emergency call, the selective router determines whether the primary PSAP is available to handle the emergency call. For instance, the selective router determines whether the PSAP is busy or has been abandoned. If the primary PSAP is available, then the selective router routes the emergency call to the primary PSAP. If the primary PSAP is not available, then the selective router performs alternate routing. The selective router identifies an alternate PSAP to handle the call, and determines whether the alternate PSAP is available to handle the emergency call. If the alternate PSAP is available, then the selective router routes the emergency call to the alternate PSAP. If the alternate PSAP is not available, then the selective router performs alternate routing again.

In a traditional emergency services network, the selective router is coupled to the PSAP over a circuit-switched network. More particularly, the selective router is coupled to the PSAP by redundant CAMA trunks. CAMA trunks have limitations in that only a small amount of information can be passed over these trunks from the selective router to the PSAP when routing the call. Typically, the selective router only passes the ANI to the PSAP over a CAMA trunk. The PSAP thus has to access the location information for the calling party from an ALI database based on the calling party number.

More recent implementations of emergency services networks implement packet-switched technology in place of circuit-switched technologies. More particularly, the selective router is connected to the PSAP's over a packet network, such as an IP network. The use of a packet network allows the selective router to pass more information to the PSAP than can be done over a CAMA trunk. As one example, the selective router can pass location information to the PSAP over the packet network. As another example, the selective router can pass additional information about the emergency situation to the PSAP over the packet network, such as that the emergency situation is at a hazardous location.

One problem with present emergency services networks, whether circuit-switched or packet-switched, is that a PSAP receiving an emergency call is not informed as to whether that PSAP is the primary PSAP or an alternate PSAP in the selective routing process. Also, a call taker at the PSAP receiving an emergency call is not informed as to the reason that he or she is receiving the call. Such reasons include, but are not limited to, the primary PSAP reached its call handling capacity or has been abandoned. In a circuit-switched network, it is not feasible to transmit such information over the CAMA trunks between the selective router and the PSAP. In a packet-switched network, no process exists or has been suggested to inform the PSAP as to whether the PSAP is the primary or an alternate.

SUMMARY OF THE INVENTION

Embodiments of the invention solve the above and other problems by having a selective routing system provide routing information to a PSAP or another alternate answering point indicating a reason for primary or alternate routing of the emergency call to the answering point. In some situations, the selective router indicates the reason for alternate routing to an alternate destination instead of a primary answering point. In one example, the routing information may indicate the call was routed using the selective routing algorithm. In another example, the alternate routing information may indicate that the primary answering point was busy which is why the emergency call was routed to the alternate answering point. In another example, the alternate routing information may indicate that the primary answering point was abandoned which is why the emergency call was routed to the alternate answering point.

Providing routing information in accordance with this invention has the advantage of facilitating the call taker's understanding of the problems of misrouted calls or the source of calls as designated by ingress trunk groups. Providing the alternate routing information to the alternate answering point provides many advantages. For instance, the alternate answering point may be informed that the emergency call did not originate in its jurisdiction because the alternate answering point was not the primary answering point. In another instance, the alternate answering point may determine that it is receiving a significant overflow of emergency calls from another answering point that is commonly busy, which means that the other answering point may need increased capacity. In another instance, the alternate answering point may determine that it is receiving a significant overflow of emergency calls from another answering point that is handling a large emergency situation, such as a hurricane or flood. In another instance, the alternate answering point may determine that it is handling emergency calls from another answering point that has been abandoned.

One embodiment of the invention includes a method of operating an emergency services network to handle routing of an emergency call. The method includes receiving an emergency call in the emergency services network, performing a selective routing process or trunk-only routing process to identify a primary answering point to handle the emergency call, and determining whether the primary answering point is available to handle the emergency call. Responsive to a determination that the primary answering point is not available to handle the emergency call, the method further includes a process to identify an alternate answering point to handle the emergency call, routing the emergency call to the alternate answering point, identifying alternate routing information indicating a reason for routing the emergency call to the alternate answering point instead of the primary answering point, and transmitting the alternate routing information to the alternate answering point.

Another embodiment of the invention includes an emergency call control system for handling emergency calls. The emergency call control system includes a packet network interface adapted to communicate over a packet network with a plurality of answering points, and a selective routing system. The selective routing system is adapted to receive an emergency call, to identify a primary answering point to handle the emergency call, and to determine whether the primary answering point is available to handle the emergency call. Responsive to a determination that the primary answering point is not available to handle the emergency call, the selective routing system is further adapted to identify an alternate answering point to handle the emergency call, to route the emergency call to the alternate answering point through the packet network interface over the packet network, to identify alternate routing information indicating a reason for routing the emergency call to the alternate answering point instead of the primary answering point, and to transmit the alternate routing information to the alternate answering point through the packet network interface over the packet network.

Another embodiment of the invention comprises an emergency services network. The emergency services network includes a plurality of answering points, an emergency call control system, and a packet network that connects the emergency call control system to the answering points. The emergency call control system is adapted to receive an emergency call, to identify a first answering point to handle the emergency call, and to determine whether the first answering point is available to handle the emergency call. Responsive to a determination that the first answering point is not available to handle the emergency call, the emergency call control system is further adapted to identify a second answering point to handle the emergency call, to route the emergency call to the second answering point over the packet network, to identify alternate routing information indicating a reason for routing the emergency call to the second answering point instead of the first answering point, and to transmit the alternate routing information to the second answering point over the packet network.

Another embodiment of the invention includes a method of operating an emergency services network to handle a transfer of an emergency call. The method includes receiving an emergency call in the emergency services network, performing a selective routing process or trunk-only routing process to identify a primary answering point to handle the emergency call, and routing the emergency call to the primary answering point. The method further includes transferring the emergency call from the primary answering point to an alternate answering point, and transmitting transfer information from the primary answering point to the alternate answering point indicating that the emergency call was transferred from the primary answering point The invention may include other exemplary embodiments described below.

BRIEF DESCRIPTION OF THE DRAWINGS

The same reference number represents the same element or same type of element on all drawings.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
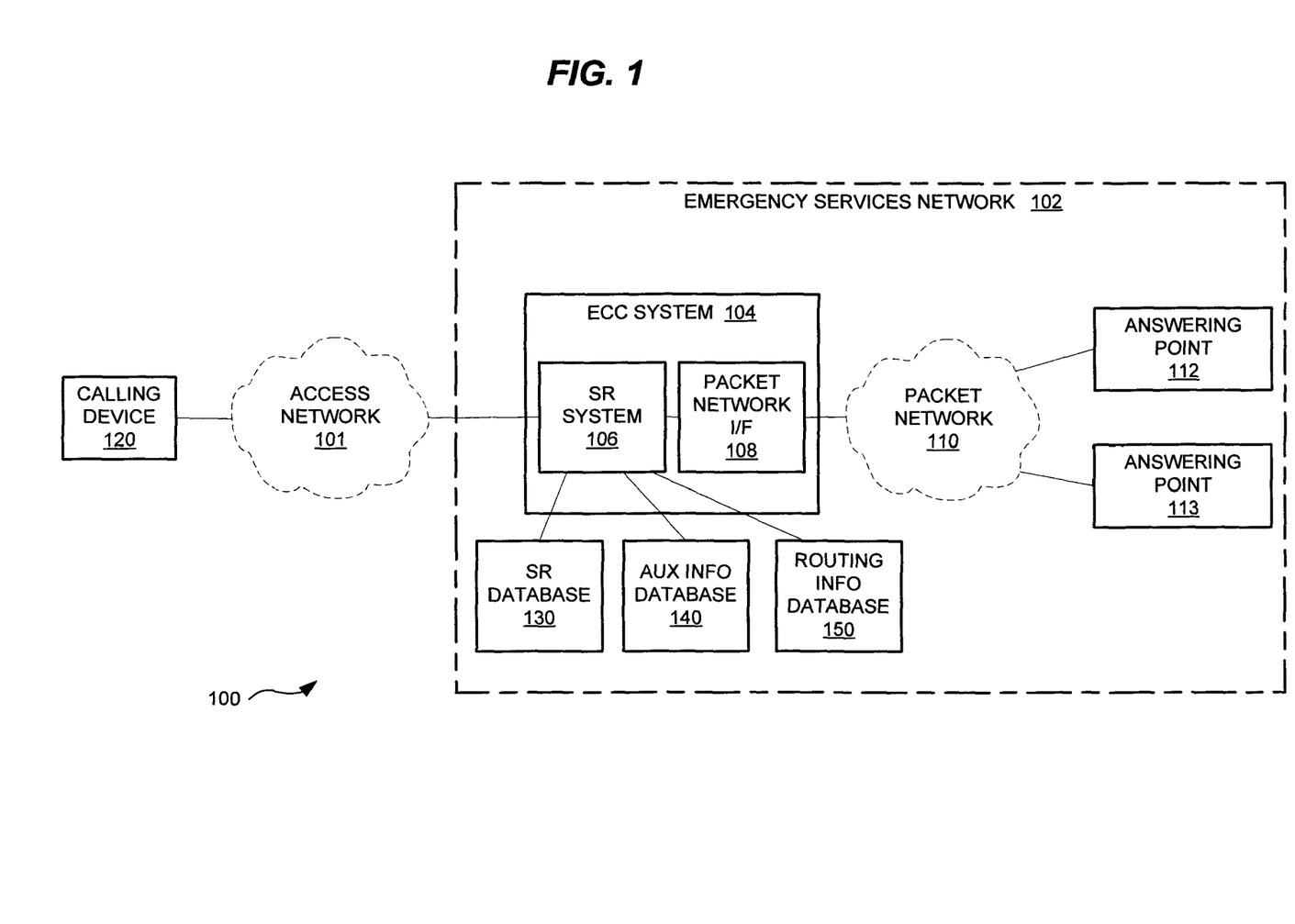
FIG. 1 illustrates a communication network in an exemplary embodiment of the invention.

FIG. 1 illustrates a communication network 100 in an exemplary embodiment of the invention. Communication network 100 is adapted to handle emergency calls. An emergency call, also referred to as a special number call or an abbreviated number call, is a call to a particular number where the communication network provides a special service to a calling party. Examples of emergency calls include 9-1-1 calls in the United States, and 1-1-2 calls in Europe. Communication network 100 is illustrated as including an access network 101 and an emergency services network 102. Access network 101 comprises any type of network adapted to provide telecommunications services to a calling device 120. Access network 101 may comprise a wireline network (e.g., a PSTN), a wireless network (e.g., a CDMA network or a GSM network), or a VoIP network. Emergency services network 102 includes an emergency call control (ECC) system 104, a packet network 110, and a plurality of answering points 112-113. An ECC system comprises any system or server adapted to control routing of emergency calls. ECC system 104 includes a selective routing (SR) system 106 and a packet network interface 108. Selective routing system 106 may connect to a selective routing database 130 that stores information on answering points connected to selective routing system 106, and may connect to an auxiliary information database 140 that stores information pertinent to routing of emergency calls to the proper answering point. For instance, the auxiliary information may comprise a language preference of the calling party, a medical condition of the calling party, etc. An answering point in emergency services network 102 comprises any system adapted to serve or handle an emergency call. One example of an answering point is a PSAP. Answering points 112-113 are VoIP capable systems, such as systems that are SIP-enabled for handling call signaling and RTP-enabled for handling voice packets.

Assume for this embodiment that an emergency call is placed by calling device 120. Access network 101, that is serving calling device 120, receives the call and identifies the call as an emergency call. Access network 101 then routes the emergency call to ECC system 104 of emergency services network 102. Responsive to receiving the emergency call, emergency services network 102 operates as described below to handle the emergency call.

Figure 2:
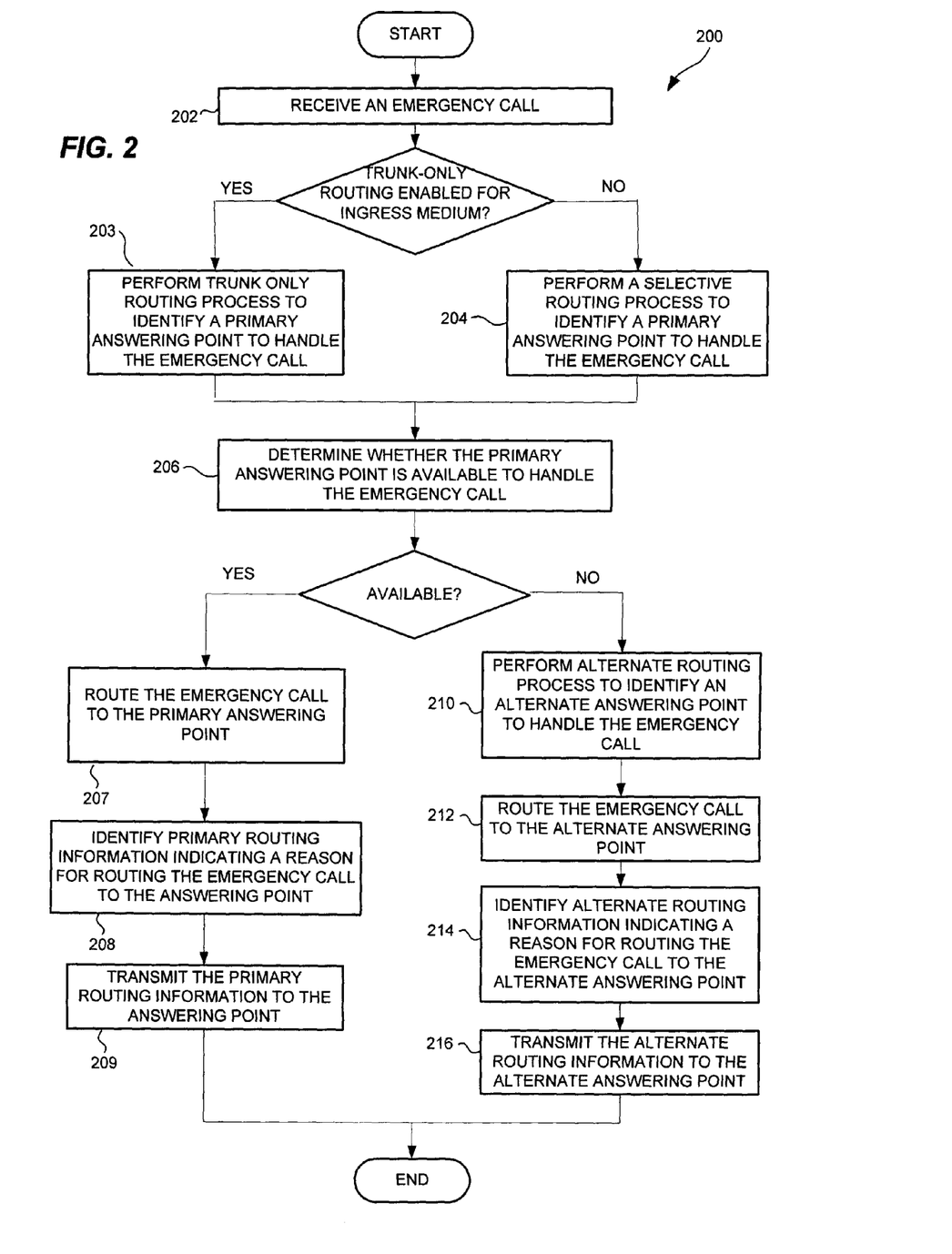
FIG. 2 is a flow chart illustrating a method of operating an emergency services network to handle routing of an emergency call in an exemplary embodiment of the invention.

FIG. 2 is a flow chart illustrating a method 200 of operating emergency services network 102 to handle routing of an emergency call in an exemplary embodiment of the invention. The steps of the flow chart in FIG. 2 are not all inclusive and may include other steps not shown.

In step 202 of method 200, selective routing system 106 receives the emergency call. Selective routing system 106 then performs a selective routing process to identify a primary answering point to handle the emergency call in step 204. As an example of a selective routing process, selective routing system 106 receives the directory number of calling device 120 in the signaling for the emergency call. Selective routing system 106 may then query a selective routing database 130 to identify an Emergency Service Number (ESN) assigned to the directory number. Selective routing database 130 stores the directory number-to-ESN relationship. Routing Information Database 150 stores information on the answering points and the status of the answering points. Routing Information database 150 may be populated automatically by selective routing system 106 or may be updated by answering points 112-113. The ESN provided by selective routing database 130 indicates a primary answering point to handle the emergency call, and may identify one or more alternate answering points to handle the emergency call. A primary answering point comprises a network node that is identified as the node to which an emergency call should be initially routed. The primary answering point may be the final destination for an emergency call or may be an intermediate destination. Assume for this embodiment that answering point 112 is identified as the primary answering point. For the selective routing process, selective routing system 106 may query auxiliary information database 140 for auxiliary information used to select the primary answering point and/or the alternate answering points. For instance, the auxiliary information may comprise a language preference for the calling party such that selective routing system 106 selects answering points adapted to handle the language preference. Those skilled in the art understand that before performing the selective routing process in step 204, selective routing system 106 may determine whether trunk-only routing is enabled as discussed above, in the Background of the Invention. This process is left out for the sake of brevity.

In step 206, selective routing system 106 determines whether the primary answering point is available to handle the emergency call. As an example, selective routing system 106 may process state data for answering point 112 to determine its availability. The state data may indicate that answering point 112 is busy, abandoned, etc. The state data may also indicate that multiple calls are queued up for answering point 112 and that answering point 112 is congested. As another example, selective routing system 106 may transmit a request message to answering point 112 over packet network 110, such as a SIP INVITE message. Selective routing system 106 may then receive a response message indicating that answering point 112 is available or indicating that answering point 112 is not available (e.g., busy). Alternatively, selective routing system 106 may not receive a response message from answering point 112 within a threshold time period which indicates that answering point 112 is not available. If answering point 112 is available to handle the emergency call, then selective routing system 106 routes the emergency call to answering point 112 over packet network 110 through packet network interface 108 and transmits information that answering point 112 is the primary destination per selective routing in step 207.

If answering point 112 is not available to handle the emergency call, then selective routing system 106 performs the selective routing process to identify an alternate answering point to handle the emergency call in step 210. An alternate answering point comprises a network node other than the primary answering point that is a final destination for an emergency call. The alternate answering point (assume answering point 113) may have been identified in the previous alternate routing process used to identify the alternate answering point. On the other hand, selective routing system 106 may determine the primary answering point based on facility administration of Trunk-only Routing 203 on the media which the call arrived from access network 101. In step 212, selective routing system 106 routes the emergency call to answering point 113 over packet network 110 through packet network interface 108.

In step 208, selective routing system 106 identifies the primary routing information for the emergency call. The primary routing information comprises either Trunk-only Routing or Selective Routing. In step 214, selective routing system 106 identifies alternate routing information for the emergency call. The alternate routing information comprises any information that indicates a reason for routing the emergency call to the alternate answering point 113 instead of the primary answering point 112. In one example, the alternate routing information may indicate that the primary answering point 112 was busy which is why the emergency call was routed to the alternate answering point 113. In another example, the alternate routing information may indicate that the primary answering point 112 was abandoned which is why the emergency call was routed to the alternate answering point 113. The alternate routing information may include other information indicating reasons for routing the call to the alternate answering point 113.

In steps 209 and 216, selective routing system 106 transmits the routing information to answering point 113 over packet network 110 through packet network interface 108. Selective routing system 106 may transmit the routing information to answering point 113 in a variety of ways. In one embodiment, selective routing system 106 transmits the routing information to answering point 113 in the signaling for the emergency call. For instance, if the signaling used over packet network 110 is SIP, then selective routing system 106 may include the routing information in a SIP message used to route the emergency call to answering point 113 (e.g., a SIP INVITE message). More particularly, selective routing system 106 may include the routing information in XML data of a SIP message header. Selective routing system 106 may push the routing information to answering point 113 upon identifying the information. Alternatively, selective routing system 106 may transmit the routing information to answering point 113 responsive to a request from answering point 113 or another device.

Selective routing system 106 may provide other types of information to answering point 113 over packet network 110 in addition to the primary routing information and alternate routing information. For instance, selective routing system 106 may provide location information to answering point 113 over packet network 110. Selective routing system 106 may provide information regarding the emergency situation that caused the emergency call. As an example, the emergency situation may have occurred in a hazardous location requiring emergency personnel to take special precautions. Selective routing system 106 may thus provide answering point 113 with additional information regarding the hazardous location.

Figure 3:
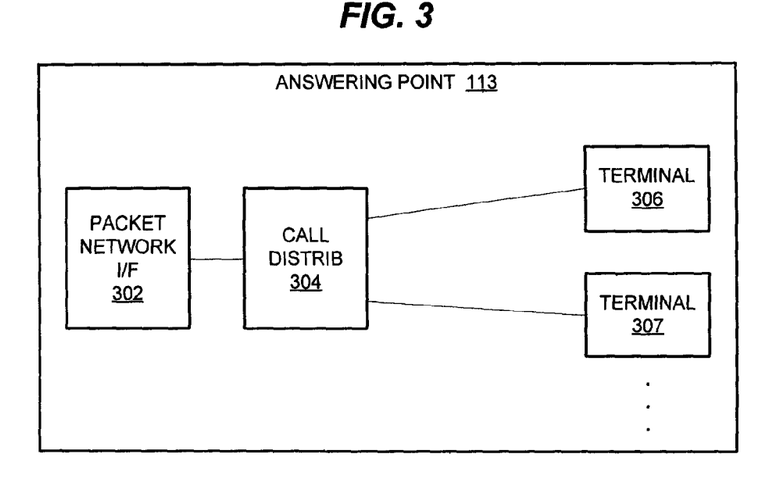
FIG. 3 illustrates an answering point in an exemplary embodiment of the invention.

FIG. 3 illustrates answering point 113 in an exemplary embodiment of the invention. Answering point 113 includes a packet network interface 302, a call distributor 304, and a plurality of terminals 306-307. Packet network interface 302 is adapted to communicate with other nodes over packet network 110 (see FIG. 1). Call distributor 304 (also referred to as an "automatic call distributor" or "ACD") comprises any system or server adapted to route incoming calls to the appropriate terminal. Terminals 306-307 comprise any equipment used by a call taker or agent to serve an emergency call, such as a telephone, a computer, etc.

Figure 4:
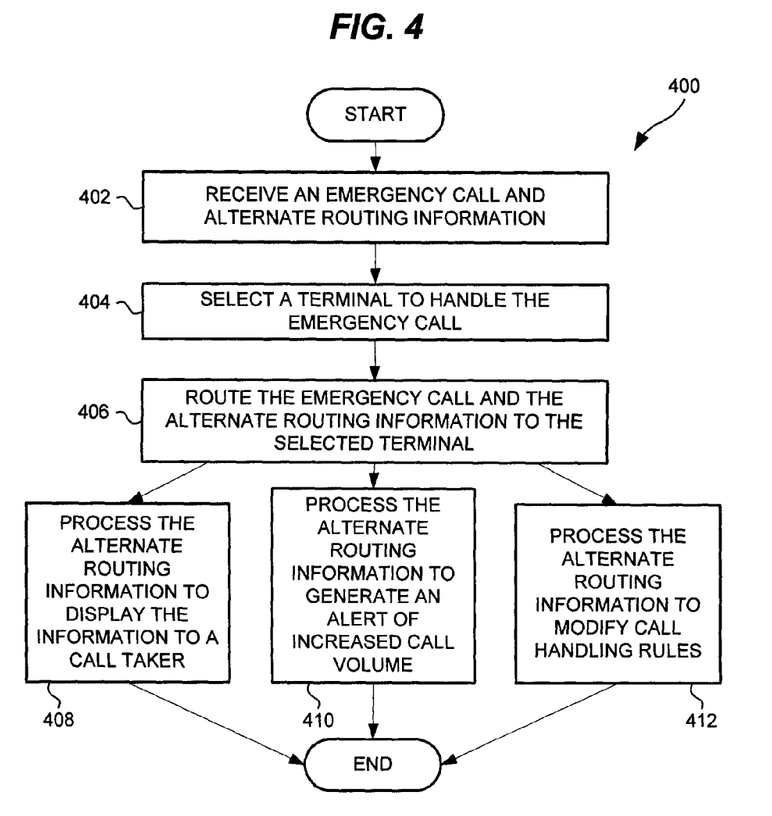
FIG. 4 is a flow chart illustrating a method of operating an answering point in an exemplary embodiment of the invention.

FIG. 4 is a flow chart illustrating a method 400 of operating answering point 113 in an exemplary embodiment of the invention. The steps of the flow chart in FIG. 4 are not all inclusive and may include other steps not shown.

In step 402 of method 400, packet network interface 302 receives the emergency call over packet network 110 as routed by selective routing system 106 (see also FIG. 1), and also receives the alternate routing information. In step 404, call distributor 304 selects a terminal to handle the emergency call (assume terminal 306 is selected). As with selective routing system 106, call distributor 304 may process auxiliary information from auxiliary information database 140 to select the terminal to handle the emergency call. For instance, if the auxiliary information includes a language preference, then call distributor 304 may select the terminal that can handle the language preference of the calling party. In step 406, call distributor 304 routes the emergency call and the alternate routing information to terminal 306. Terminal 306 receives the emergency call and alternate routing information. Terminal 306 may then operate in many desired ways responsive to receiving the alternate routing information.

In step 408, terminal 306 processes the alternate routing information to display the alternate routing information to a call taker. The call taker may then handle the emergency call. The call taker may advantageously be in a better position to handle the call based on the alternate routing information that accompanied the emergency call.

In an additional or alternative step 410, terminal 306 processes the alternate routing information to generate an alert of increased call volume. As an example, if the alternate routing information indicates that the primary answering point 112 was abandoned, then terminal 306 may generate an alert that answering point 113 can expect an increased call volume so that additional call takers may be added in answering point 113. In another example, if the alternate routing information indicates that the primary answering point 112 is busy, such as for a natural disaster, then terminal 306 may also generate an alert that answering point 113 can expect an increased call volume.

In an additional or alternative step 412, terminal 306 processes the alternate routing information to modify call handling rules in call distributor 304. Call distributor 304 determines which terminal 306-307 to route emergency calls based on call handling rules. Responsive to processing the alternate routing information, terminal 306 (or alternatively call distributor 304) may modify the call handing rules so that calls may be more efficiently handled within answering point 113. Examples include language preference of caller or otherwise matching a skill set between the caller and call handler.

Methods 200 and 400 above describe how alternate routing is handled in emergency services network 102, such as by selective routing system 106. In emergency services network 102, an emergency call that was routed to one answering point may be transferred to another answering point. For example, the first answering point initially receiving the emergency call may perform a screening function to determine if the call is legitimate or to determine a second answering point that should handle the emergency call. The first answering point would then transfer the emergency call to the second answering point. In this call transfer scenario, it may be advantageous to provide the second answering point with transfer information indicating that the emergency call was transferred from another answering point (instead of being a new inbound call), and/or other information about the transfer.

Figure 5:
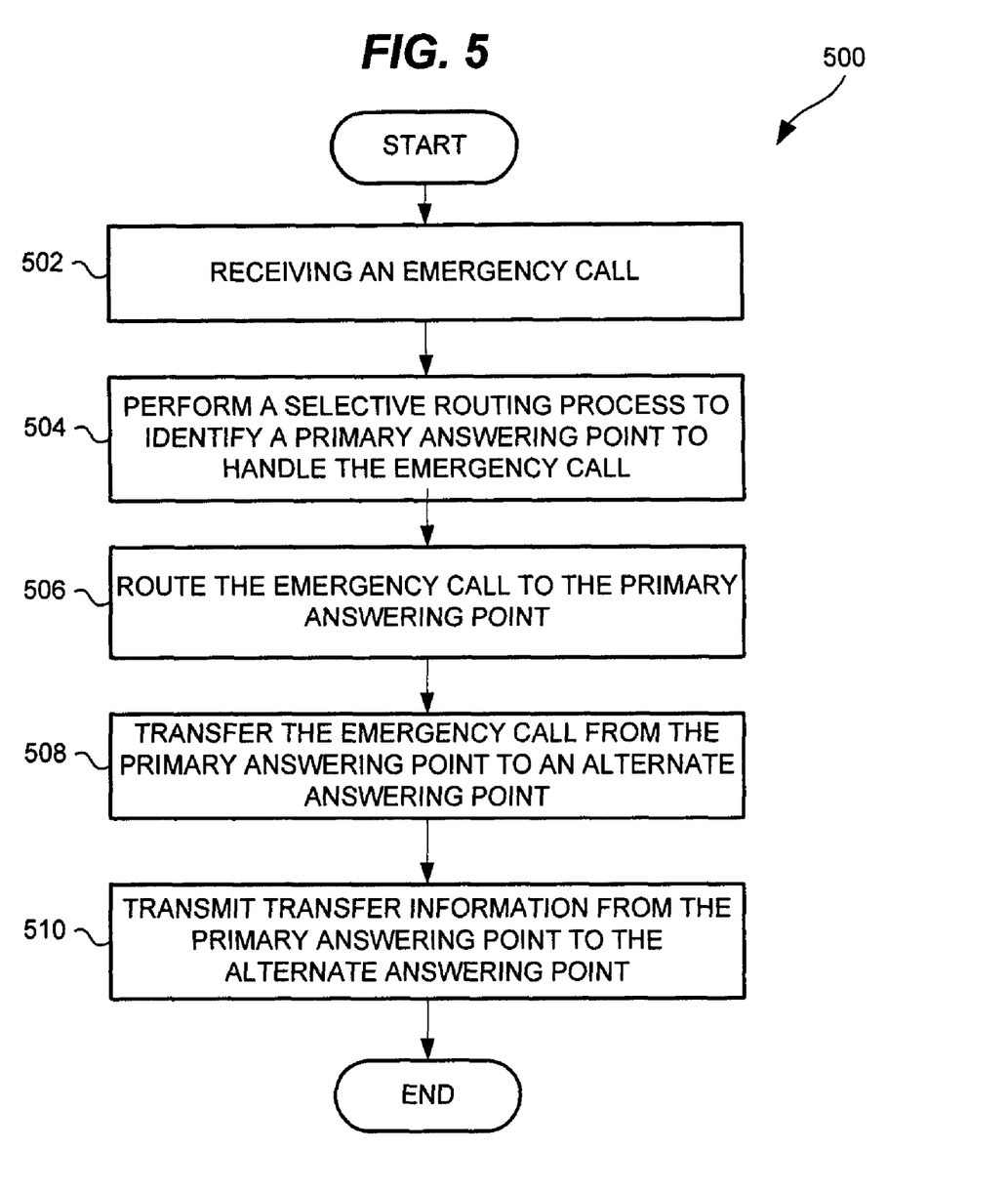
FIG. 5 is a flow chart illustrating a method of operating an emergency services network to handle a transfer of an emergency call in an exemplary embodiment of the invention.

FIG. 5 is a flow chart illustrating another method 500 of operating emergency services network 102 to handle a transfer of an emergency call in an exemplary embodiment of the invention. The steps of the flow chart in FIG. 5 are not all inclusive and may include other steps not shown.

In step 502 of method 500, selective routing system 106 receives the emergency call. Selective routing system 106 then performs a selective routing process to identify a primary answering point to handle the emergency call in step 504. Assume for this embodiment that answering point 112 is identified as the primary answering point. In step 506, selective routing system 106 routes the emergency call to answering point 112 over packet network 110 through packet network interface 108.

Answering point 112 receives the emergency call. There may be one or more reasons why answering point 112 is not the final destination for the emergency call. For instance, answering point 112 may perform screening of emergency calls, but is not equipped to handle the emergency call in such a way to dispatch emergency personnel. Answering point 112 or a call taker in answering point 112 would then determine that the emergency call needs to be transferred to an alternate answering point that is equipped to dispatch emergency personnel.

When a determination is made that answering point 112 is not the final destination for the emergency call, answering point 112 transfers the emergency call to an alternate answering point over packet network 110 in step 508 (assume answering point 113 in this embodiment). Answering point 112 also transmits transfer information to answering point 113. Transfer information comprises any information regarding a transfer of an emergency call from one answering point to another. The transfer information may simply indicate that the emergency call was transferred from another answering point so that answering point 113 is aware that the emergency call is not a new incoming call. Answering point 112 may transmit the transfer information to answering point 113 in a variety of ways. In one embodiment, answering point 112 may transmit the transfer information to answering point 113 in the signaling for the emergency call. For instance, if the signaling used over packet network 110 is SIP, then answering point 112 may include the transfer information in a SIP message used to route the emergency call to answering point 113 (e.g., a SIP INVITE message). More particularly, answering point 112 may include the transfer information in XML data of a SIP message header.

Figure 6:
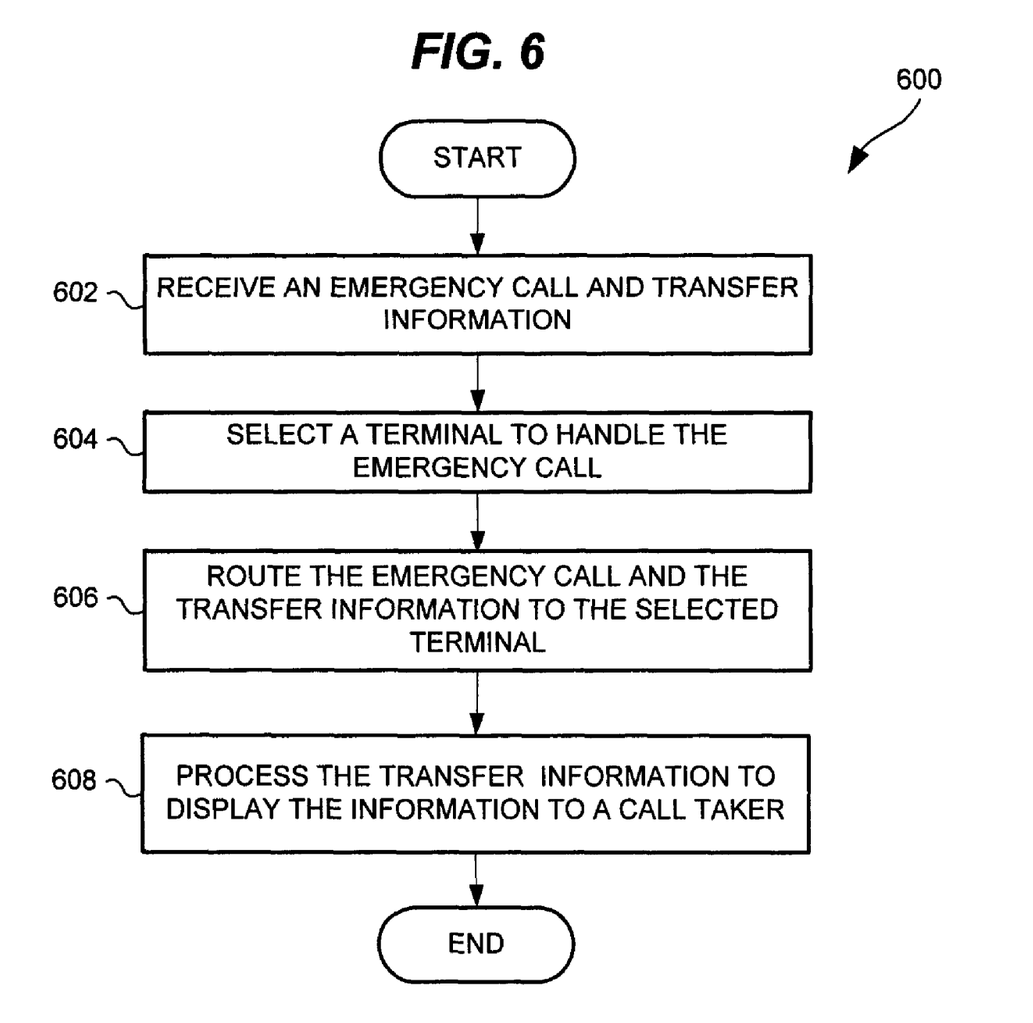
FIG. 6 is a flow chart illustrating another method of operating an answering point in an exemplary embodiment of the invention.

FIG. 6 is a flow chart illustrating another method 600 of operating answering point 113 in an exemplary embodiment of the invention. The steps of the flow chart in FIG. 6 are not all inclusive and may include other steps not shown.

In step 602 of method 600, packet network interface 302 (see FIG. 3) receives the emergency call over packet network 110 as transferred by answering point 112 (see also FIG. 1), and also receives the transfer information. In step 604, call distributor 304 selects a terminal to handle the emergency call (assume terminal 306 is selected). In step 606, call distributor 304 routes the emergency call and the transfer information to terminal 306 to which terminal 306 receives the emergency call and the transfer information. Terminal 306 may then operate in many desired ways responsive to receiving the transfer information.

In step 608, terminal 306 processes the transfer information to display the transfer information to a call taker. The call taker may then handle the emergency call. The call taker may advantageously be in a better position to handle the call based on the transfer information that accompanied the emergency call.

Although specific embodiments were described herein, the scope of the invention is not limited to those specific embodiments. The scope of the invention is defined by the following claims and any equivalents thereof.

The invention claimed is:

1. A method of operating an emergency services network, the method comprising:
   receiving an emergency call in the emergency services network;
   performing one of a selective routing process and a trunk-only routing process to identify a primary answering point to handle the emergency call;
   determining whether the primary answering point is available to handle the emergency call;
   if the primary answering point is available to handle the emergency call, identifying first routing information indicating a reason for routing the emergency call to the primary answering point and routing the emergency call to the primary answering point with the first routing information; and
   if the primary answering point is not available to handle the emergency call, performing one of the selective routing process and the trunk-only routing process to identify an alternate answering point available to handle the emergency call, identifying second routing information indicating a reason for routing the emergency call to the alternate answering point and routing the emergency call to the alternate answering point with the second routing information.

2. The method of claim 1 wherein transmitting the first routing information to the primary answering point or transmitting the second routing information to the alternate answering point comprises:
   transmitting the first routing information or the second routing information over a packet network.

3. The method of claim 2 wherein the packet network uses SIP signaling and wherein transmitting the first routing information to the primary answering point comprises:
   transmitting the first routing information in the SIP signaling used to route the emergency call to the primary answering point.

4. The method of claim 3 wherein transmitting routing information to the primary answering point in the SIP signaling comprises:
   Including alternate routing information in XML data of the SIP signaling.

5. A method of operating an emergency services network, the method comprising:
   receiving an emergency call in the emergency services network;
   performing one of a selective routing process and a trunk-only routing process to identify a primary answering point to handle the emergency call;
   determining whether the primary answering point is available to handle the emergency call;
   performing one of the selective routing process and the trunk-only routing process to identify an alternate answering point to handle the emergency call responsive to a determination that the primary answering point is not available to handle the emergency call;
   routing the emergency call to the alternate answering point;
   identifying alternate routing information indicating a reason for routing the emergency call to the alternate answering point instead of the primary answering point; and
   transmitting the alternate routing information to the alternate answering point.

6. The method of claim 5 wherein transmitting the alternate routing information to the alternate answering point comprises:
   transmitting the alternate routing information to the alternate answering point over a packet network.

7. The method of claim 6 wherein the packet network uses SIP signaling and wherein transmitting the alternate routing information to the alternate answering point comprises:
   transmitting the alternate routing information to the alternate answering point in the SIP signaling used to route the emergency call to the alternate answering point.

8. The method of claim 7 wherein transmitting the alternate routing information to the alternate answering point in the SIP signaling comprises:
   including the alternate routing information in XML data of the SIP signaling.

9. The method of claim 5 wherein the alternate routing information includes an indication that the primary answering point was busy.

10. The method of claim 5 wherein the alternate routing information includes an indication that the primary answering point was abandoned.

11. An emergency call control system for handling emergency calls, the emergency call control system comprising:
a packet network interface adapted to communicate over a packet network with a plurality of answering points; and
a selective routing system adapted to receive an emergency call, to identify a primary answering point to handle the emergency call, and to determine whether the primary answering point is available to handle the emergency call;
the selective routing system, responsive to a determination that the primary answering point is not available to handle the emergency call, is further adapted to identify an alternate answering point to handle the emergency call, to route the emergency call to the alternate answering point through the packet network interface over the packet network, to identify alternate routing information indicating a reason for routing the emergency call to the alternate answering point instead of the primary answering point, and to transmit the alternate routing information to the alternate answering point through the packet network interface over the packet network.

12. The emergency call control system of claim 11 wherein the selective routing system is further adapted to:
transmit the alternate routing information to the alternate answering point through the packet network interface over the packet network in SIP signaling used to route the emergency call to the alternate answering point.

13. The emergency call control system of claim 12 wherein the selective routing system is further adapted to:
include the alternate routing information in XML data of the SIP signaling.

14. The emergency call control system of claim 11 wherein the alternate routing information includes an indication that the primary answering point was busy.

15. The emergency call control system of claim 11 wherein the alternate routing information includes an indication that the primary answering point was abandoned.

16. An emergency services network, comprising:
a plurality of answering points;
an emergency call control system; and
a packet network connecting the emergency call control system to the plurality of answering points;
the emergency call control system adapted to receive an emergency call, to identify a first answering point to handle the emergency call, and to determine whether the first answering point is available to handle the emergency call;
the emergency call control system, responsive to a determination that the first answering point is not available to handle the emergency call, is further adapted to identify a second answering point to handle the emergency call, to route the emergency call to the second answering point over the packet network, to identify alternate routing information indicating a reason for routing the emergency call to the second answering point instead of the first answering point, and to transmit the alternate routing information to the second answering point over the packet network.

17. The emergency services network of claim 16 wherein the emergency call control system is further adapted to:
transmit the alternate routing information to the second answering point in the SIP signaling used to route the emergency call to the second answering point.

18. The emergency services network of claim 17 wherein the emergency call control system is further adapted to:
include the alternate routing information in XML data of SIP signaling.

19. The emergency services network of claim 16 wherein the alternate routing information includes an indication that the first answering point was busy.

20. The emergency services network of claim 16 wherein the alternate routing information includes an indication that the first answering point was abandoned.

21. A method of operating an answering point for handling emergency calls, the method comprising:
receiving an emergency call and alternate routing information over a packet network, wherein the alternate routing information indicates a reason for routing the emergency call to the answering point instead of another answering point;
selecting a terminal in the answering point to handle the emergency call;
routing the emergency call and the alternate routing information to the selected terminal; and
processing, in the selected terminal, the alternate routing information to display the alternate routing information to a call taker.

22. The method of claim 21 further comprising:
processing the alternate routing information to generate an alert of increased call volume.

23. The method of claim 21 further comprising:
processing the alternate routing information to modify call handling rules in the answering point.

24. A method of operating an emergency services network, the method comprising:
receiving an emergency call in the emergency services network;
performing one of a selective routing process and a trunk-only routing process to identify a primary answering point to handle the emergency call;
routing the emergency call to the primary answering point;
transferring the emergency call from the primary answering point to an alternate answering point; and
transmitting transfer information from the primary answering point to the alternate answering point indicating that the emergency call was transferred from the primary answering point.

25. The method of claim 24 wherein transmitting transfer information from the primary answering point to the alternate answering point comprises:
transmitting the transfer information from the primary answering point to the alternate answering point over a packet network.

26. The method of claim 25 wherein the packet network uses SIP signaling and wherein transmitting transfer information from the primary answering point to the alternate answering point comprises:
transmitting the transfer information from the primary answering point to the alternate answering point in the SIP signaling used to transfer the emergency call to the alternate answering point.

27. The method of claim 26 wherein transmitting transfer information from the primary answering point to the alternate answering point in the SIP signaling comprises:
including the transfer information in XML data of the SIP signaling.

* * * * *